Patented Mar. 10, 1953

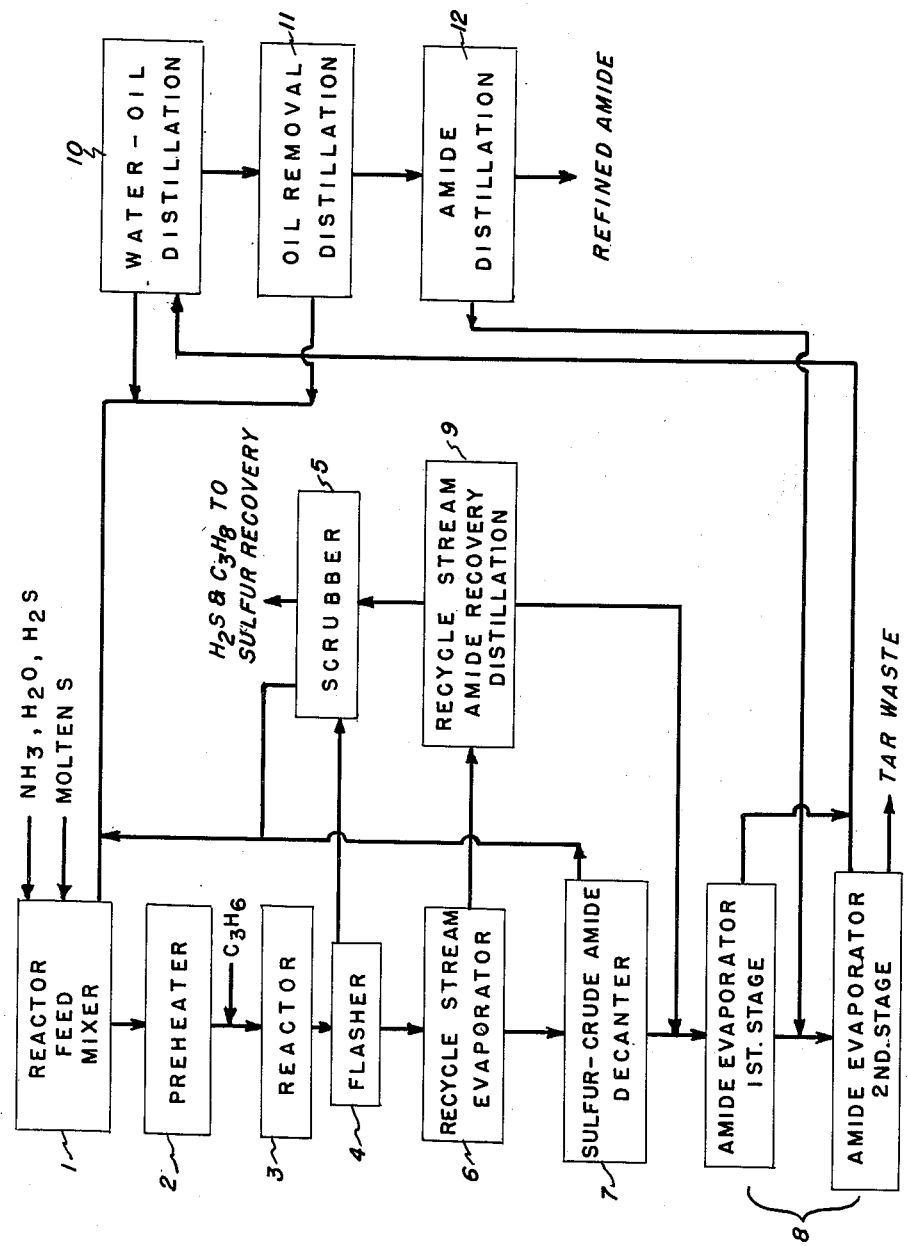

2,631,166

UNITED STATES PATENT OFFICE 2,631,166

METHOD FOR SEPARATING REACTION PRODUCTS OBTAINED BY REACTION BETWEEN PROPYLENE AND AQUEOUS AMMONIUM POLYSULFIDE

Martval John Paul Hartig, Gwinhurst, Del., assignor to E. I. du Pont de Nemours and Company, Wilmington, Del., a corporation of Delaware Application February 12, 1952, Serial No. 271,143

2 Claims. (Cl. 260—561)

This invention relates to an improved process for the separation of propionamide from products obtained in reaction between propylene and aqueous ammonium polysulfide.

In the copending Naylor application, S. N. 214,840, filed March 9, 1951, which is a continuation-in-part of application S. N. 185,907, filed September 20, 1950, now abandoned, it is disclosed that certain olefin-sulfur oils obtained as by-products in the formation of amides from olefins and aqueous ammonium polysulfide can be recycled with a further quantity of aqueous ammonium polysulfide at 200° to 350° C. whereby an additional quantity of amide is produced. The present invention is concerned with methods for separating propionamide from reaction products obtained in the aforesaid process and in other related processes for producing amides from olefins, ammonium polysulfide and water.

The mixed reaction products obtained in the processes hereinabove mentioned are relatively complex, and contain propylene-sulfur oils, propionic acid, propionamide, sulfur, and tarry substances. Separation of the volatile ingredients at elevated temperatures leaves behind a mixture containing free sulfur, which is a difficult ingredient to handle under the circumstances, especially since it reacts with propionamide rapidly at temperatures above 180° C.

An object of the present invention is to provide a suitable improved method for working up the reaction products above described. Other objects of the invention will appear hereinafter.

These objects can be accomplished in accordance with the present invention by carrying out the series of steps defined below. One of the important features of the present invention resides in passing the reactor effluent through a "flasher" to produce a relatively non-volatile mixture having two liquid phases, one of which comprises free liquid sulfur, followed by decanting the molten sulfur layer and recycling it to the reactor feed supply. The process of the invention is performed by mixing ammonia, hydrogen sulfide, and water, with molten sulfur, preheating the resultant mixture under super-atmospheric pressure to a temperature within the range of 100° to 200° C., injecting propylene into the pre-heated mixture, passing the resulting mixture through a reaction zone at a temperature within the range of 220° to 300° C., under a pressure of 150 to 1000 atmospheres, removing from the reaction zone an effluent comprising ammonium polysulfide, water, propionamide, propionic acid, propane, and tars, flashing the said effluent by lowering the pressure to within the range of 10–100 atmospheres whereby, at a temperature of 125° to 175° C., an overhead vapor stream comprising hydrogen sulfide, propane, ammonia and water is produced, condensing water and ammonia from the said overhead stream, preferably in a water scrubber, at a temperature within the range of 20° to 100° C. under a pressure within the range of 10 to 100 atmospheres, whereby a vapor stream comprising hydrogen sulfide, water and propane is produced, conducting at least a part of the latter vapor stream to a sulfur recovery system wherein hydrogen sulfide is converted to sulfur, returning the said sulfur in molten form to the reactor feed, returning also the water-ammonia condensate, with make-up hydrogen sulfide and ammonia, to the reactor feed, removing the bottoms reduced by the said flasher to a "recycle stream evaporator" operating at a total pressure of 1–5 atmospheres at a temperature of 120° to 180° C., to produce a vapor and a two-layered liquid, conducting the liquid to a decanter, separating therefrom, under superatmospheric pressure, a molten sulfur layer and a crude aqueous amide layer, recycling the sulfur layer to the said reactor feed, distilling water from the said amide layer in a propionamide recovery still and thereafter separating propionamide from the resulting residue by distillation. In a particular embodiment the vapor produced in the said "recycle stream evaporator" is conducted to a condenser wherein the more volatile ingredients are separated and sent to the scrubber, a small quantity of propionamide-containing condensate being withdrawn and sent to the propionamide recovery still.

The invention is illustrated further by means of the accompanying diagrammatic drawing. Into a mixing vessel 1 is introduced ammonia, water, and hydrogen sulfide. Molten sulfur is added with vigorous mixing. This mixture after thorough mechanical agitation is conducted through a pre-heater 2 which raises the temperature to about 150° C. Liquid propylene is pumped into the effluent from the pre-heater 2 and the resulting mixture is conducted through a reactor 3 at a temperature of about 250° C. at a pressure of 700 atmospheres. The effluent from the reactor 3 is conducted into an adiabatic flasher 4 wherein the pressure is suddenly dropped to 200 pounds per square inch to produce a vapor stream and a liquid effluent. The vapor stream contains hydrogen sulfide, water, propane, and ammonia and only a trace of propionamide. This stream is conducted through a water scrubber 5 for recovery of propionic acid and ammonia, and since this scrubber 5 is operated under acidic conditions, the hydrogen sulfide (along with propane) remains largely in the vapor phase. The mixture of hydrogen sulfide and propane from this scrubber is conducted to a commercial unit for converting hydrogen sulfide to sulfur. Several such units are well known in the art, a typical example thereof being the so-called "Thylox" unit which can be purchased as a "package plant." If desired, the sulfur which is recovered in the sulfur recovery unit can be recycled to the reactor feed mixer hereinabove mentioned (1). The liquid effluent from the adiabatic flasher is conducted into an evaporator 6 which produces a liquid phase and a vapor phase. The liquid phase contains two layers, one of which is rich in sulfur, the other being rich in propionamide. The sulfur layer is withdrawn and recycled to the reactor feed mixer 1 by means of a decanter 7. The amide phase is conducted to another evaporator 8. The vapor phase from the evaporator 6 is conducted to a still wherein a distillation residue containing amide is produced, the remainder of the mixer being conducted to the scrubber 5. The amide residue from the still 9 is also withdrawn and conducted to the amide evaporator 8. The amide evaporator 8 produces an aqueous vapor phase and an amide phase. The aqueous vapor phase is conducted to a still 10 whereby a water-oil mixture is condensed and sent to the reactor feed mixer. The non-aqueous residue is also distilled in the still 11, yielding more oils for recycling and crude amide, which is redistilled in the still 12.

The following tables show the quantities of materials processed as hereinabove described.

TABLE 1

*Material balances*

| Overall Balance | 55 ft. Coil as Reactor, ⅙ in. I. D. | | 197 ft. Coil as Reactor, ¼ in. I. D. | |
| --- | --- | --- | --- | --- |
| Ingredient: | in, #/hr. | out, #/hr. | in, #/hr. | out, #/hr. |
| C₃H₆ | 4.24 | 0 | 12.35 | |
| C₃H₈ | 0.17 | .43 | .65 | 1.18 |
| H₂O | 4.56 | 4.98 | 25.15 | 18.46 |
| NH₃ | 2.67 | 1.54 | 16.86 | 12.69 |
| S | 7.81 | 1.74 | 25.95 | 6.09 |
| H₂S | 1.53 | 6.96 | 7.68 | 26.35 |
| Amide | | 5.28 | | 16.90 |
| Acid | | .10 | | .84 |
| Other | | 1.21 | | |
| Total | 20.98 | 22.24 | 88.64 | 82.51 |

TABLE 2

*Composition and split of reactor effluent obtained in flasher*

[200 p. s. i. g. 155° C.]

| Composition | Flasher Feed (Reactor Effluent) | Flasher Effluent | | Proportion of Component Going Overhead |
| --- | --- | --- | --- | --- |
| | | Overhead | Bottoms | |
| | Percent | Percent | Percent | Percent |
| C₃H₆ | 0.0 | 0.0 | 0.0 | 0.0 |
| H₂O | 22.4 | 19.6 | 25.1 | 46.2 |
| NH₃ | 15.4 | 23.2 | 6.8 | 79.0 |
| H₂S | 31.9 | 53.5 | 8.25 | 87.7 |
| S | 7.4 | 0.05 | 15.5 | 0.3 |
| PAM | 20.5 | 0.8 | 42.2 | 2.1 |
| PA | 1.0 | 0.0 | 2.15 | 0.0 |
| C₃H₈ | 1.4 | 2.75 | 0.0 | 100.0 |
| Split | (82.5#) | 52.5 (43.2#) | 47.5 (39.3#) | |

Numerous advantages have resulted from the various steps hereinabove described. To obtain maximum yields it was found to be essential to preheat the reactor feed prior to introduction of propylene. This virtually eliminated undesirable side reactions between propylene and the other components of the reactor feed, and as a result the reaction which took place was carried out entirely at the optimum temperature prevailing in the reaction zone. An important problem was the elimination of the reaction between hot sulfur and propionamide. This was accomplished by means of the adiabatic flasher, and by evaporating the effluent from this flasher at a controlled temperature to such a stage that a two-layer mixture of liquid sulfur and crude amide was produced. A convenient method was thus provided for recycling a large part of the recovered sulfur. The system for recovery of amide and recycling of the oils was found to be particularly advantageous in that it provided a satisfactory method for separation of refined amide and for removal of tar, as well as for returning recovered sulfur to the reactor.

The method hereinabove described has been shown to be effective for relatively large scale operation without the necessity for frequent shut-downs to remove from the reactor or the recovery system tarry products or other undesirable ingredients of the various liquid and vapor streams.

Having now described our invention, it will be understood that various modifications may be resorted to within the scope of the invention as defined by the appended claims.

I claim:

1. In a process for the synthesis of propionamide the steps which comprise admixing ammonia, hydrogen sulfide, and water with molten sulfur, preheating the resultant mixture to a temperature within the range of 100° to 200° C., injecting propylene into the said preheated mixture, passing the resulting mixture through a reaction zone at a temperature of 220° to 300° C. under a pressure of 150 to 1000 atmospheres, removing from the reaction zone an effluent comprising ammonium polysulfide, propionamide, propionic acid, propane, and tars, flashing the said effluent to a pressure within the range of 10 to 100 atmospheres, whereby an overhead vapor stream comprising hydrogen sulfide, propane, ammonia, and water is produced, cooling the said overhead stream to produce a condensate and another overhead vapor stream at a temperature of 20° to 100° C. under a pressure of 10 to 100 atmospheres, said condensate comprising water and ammonia, the latter vapor stream comprising hydrogen sulfide, water, and propane, conducting the latter stream to a sulfur recovery unit for converting hydrogen sulfide to sulfur, returning the thus recovered sulfur in molten form to the reactor feed mixer, returning also the said condensate with make-up hydrogen sulfide and ammonia to the reactor feed mixer, removing the bottoms produced by the flasher to a so-called recycle stream evaporator operating at a total pressure of 1–5 atmospheres at a temperature of 120°–180° C. to produce a vapor and a two-layered liquid, conducting the liquid to a decanter, separating therefrom under superatmospheric pressure a molten sulfur layer and a crude aqueous amide layer, recycling the sulfur layer to the reactor feed, distilling water from the said amide layer, and thereafter separating refined propionamide from the resulting residue by distillation.

2. Process of claim 1 wherein the vapor produced in the "recycle stream evaporator" is conducted to a condenser wherein the more volatile ingredients are separated and sent to the sulfur recovery system, the less voltatile ingredients being forwarded to the refined propionamide recovery system.

MARTVAL JOHN PAUL HARTIG.

No references cited.